(12) United States Patent
Takeyama et al.

(10) Patent No.: US 11,704,491 B2
(45) Date of Patent: Jul. 18, 2023

(54) INFORMATION PROCESSING APPARATUS, INFORMATION PROCESSING METHOD, AND STORAGE MEDIUM STORING INFORMATION PROCESSING PROGRAM

(71) Applicant: KABUSHIKI KAISHA TOSHIBA, Tokyo (JP)

(72) Inventors: Yasutoyo Takeyama, Kawasaki (JP); Yoshiyuki Kokojima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 14 days.

(21) Appl. No.: 17/186,258

(22) Filed: Feb. 26, 2021

(65) Prior Publication Data
US 2022/0075943 A1 Mar. 10, 2022

(30) Foreign Application Priority Data
Sep. 9, 2020 (JP) .................................. 2020-151010

(51) Int. Cl.
*G06F 40/284* (2020.01)
*G06F 40/216* (2020.01)
*G06F 16/35* (2019.01)

(52) U.S. Cl.
CPC ............ *G06F 40/284* (2020.01); *G06F 16/35* (2019.01); *G06F 16/353* (2019.01); *G06F 16/355* (2019.01); *G06F 40/216* (2020.01)

(58) Field of Classification Search
CPC .... G06F 40/216; G06F 40/284; G06F 16/353; G06F 16/35; G06F 16/355
See application file for complete search history.

(56) References Cited

U.S. PATENT DOCUMENTS

| 2004/0117736 A1* | 6/2004 | Newman ............... G06Q 10/107 715/229 |
| 2014/0247461 A1* | 9/2014 | Willamowski ..... G06Q 10/0639 358/1.15 |
| 2015/0142707 A1* | 5/2015 | Charif .................... G06N 20/00 706/12 |
| 2015/0199331 A1* | 7/2015 | Anisimovich ........ G06F 40/284 704/9 |
| 2020/0110780 A1* | 4/2020 | Tamura ................. G06F 40/284 |

FOREIGN PATENT DOCUMENTS

| JP | 2012-233979 A | 11/2012 |
| JP | 2013-130929 A | 7/2013 |

* cited by examiner

*Primary Examiner* — Chau T Nguyen
(74) *Attorney, Agent, or Firm* — Oblon, McClelland, Maier & Neustadt, L.L.P.

(57) ABSTRACT

An information processing apparatus includes a processor. The processor receives an input of a graph structure. The graph structure has nodes including text and edge. The processor assigns the nodes to one or more clusters. The processor partitions the text into words. The processor classifies the words into 1) a word representing a subject or target of an operation, 2) a word representing a content or state of the operation, and 3) other words. The processor extracts a frequent word by counting a frequency of occurrence of one or more words classified as the words representing the subject or target of the operation and extracts a frequent word by counting a frequency of occurrence of one or more words classified as the words representing the content or state of the operation, for the respective clusters.

11 Claims, 7 Drawing Sheets

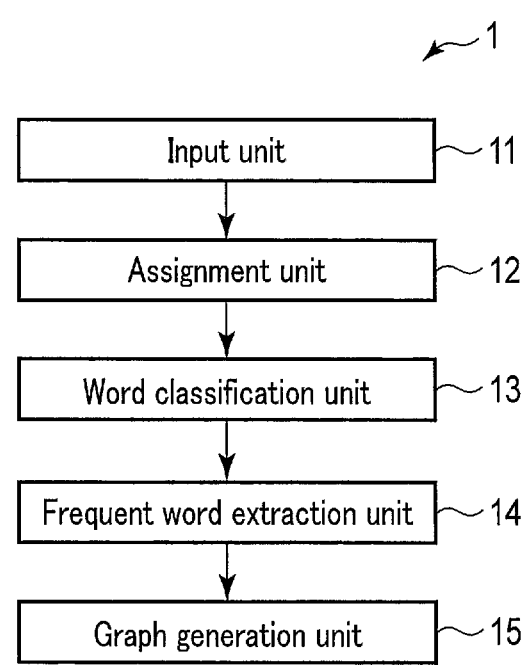
F I G. 1

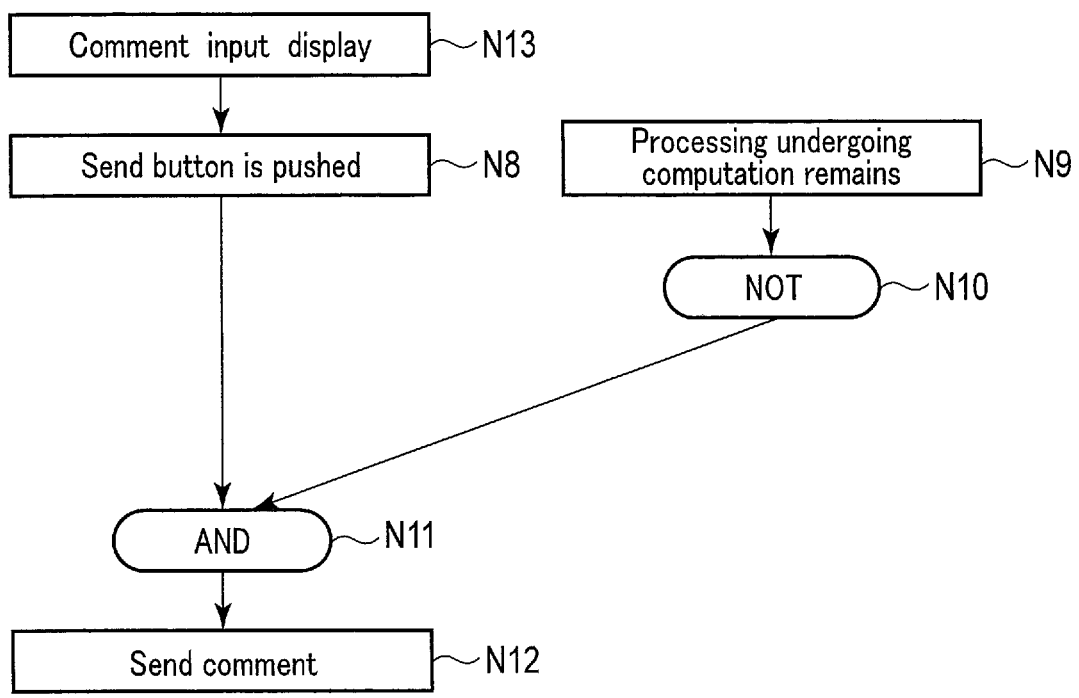
F I G. 5B

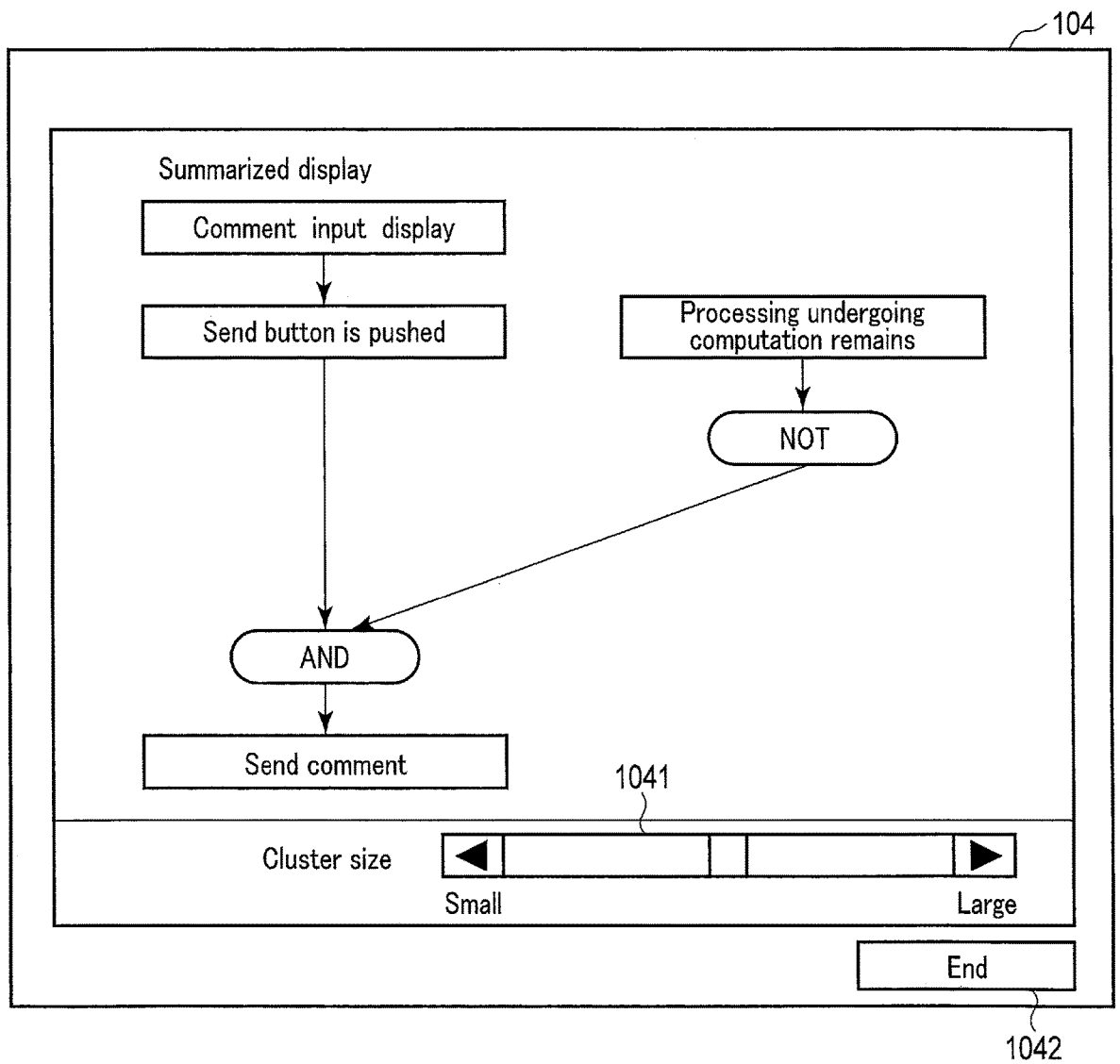
F I G. 6

INFORMATION PROCESSING APPARATUS, INFORMATION PROCESSING METHOD, AND STORAGE MEDIUM STORING INFORMATION PROCESSING PROGRAM

CROSS-REFERENCE TO RELATED APPLICATIONS

This application is based upon and claims the benefit of priority from the Japanese Patent Application No. 2020-151010, filed Sep. 9, 2020, the entire contents of which are incorporated herein by reference.

FIELD

Embodiments described herein generally relate to an information processing apparatus, an information processing method, and a storage medium storing an information processing program.

BACKGROUND

Work to combine, in a graph structure, operating conditions and operation content of a program or a device is typically performed when designing such a program or device. Such operating conditions and operation content are often wide-ranging. Hence, the combined graph structure often has a large number of nodes and is enormous. Due to the limitations of the display screen, even though the whole of an oversized graph structure may be displayed all at once, the user is unable to read the content of the graph structure. When, on the other hand, only part of the oversized graph structure is displayed using enlargement, the user is unable to grasp the full content of the graph structure. Therefore, with an oversized graph structure, it is difficult to gain an overview, or to check for omissions or oversights. Thus, there is a heightened demand for a technology that makes it easy to grasp all the content by summarizing a graph structure that has a large number of nodes.

In the case of conventional technology, a graph structure is divided into a plurality of clusters by using graph cuts, and text representing each cluster is determined according to frequent words present in the nodes included in the clusters. From the text representing each cluster, the user is able to easily grasp all the content of the graph structure even in a state where the content has been divided among a plurality of clusters.

Here, the text representing each cluster is similar due to the graph structure. For example, in the case of a graph structure that represents the operation of a program, words such as "data", "error", "update", "save", and "display" readily occur in all the clusters, and in the case of a graph structure that represents the operation of a device, words such as "switch", "voltage", "detection", and "startup" readily occur in all the clusters. In this case, a plurality of clusters are similarly represented by these words. When a plurality of clusters are represented by the same text, differences between the clusters are not discernible. It is difficult for the user to grasp the full content of the graph structure in such cases.

BRIEF DESCRIPTION OF THE DRAWINGS

FIG. 1 is a diagram illustrating a configuration of an example of an information processing apparatus according to each of the embodiments;

FIG. 5B is a diagram illustrating an example of a summarized graph structure; and FIG. 6 is a diagram illustrating a display example of the summarized graph structure.

DETAILED DESCRIPTION

Figure 2:
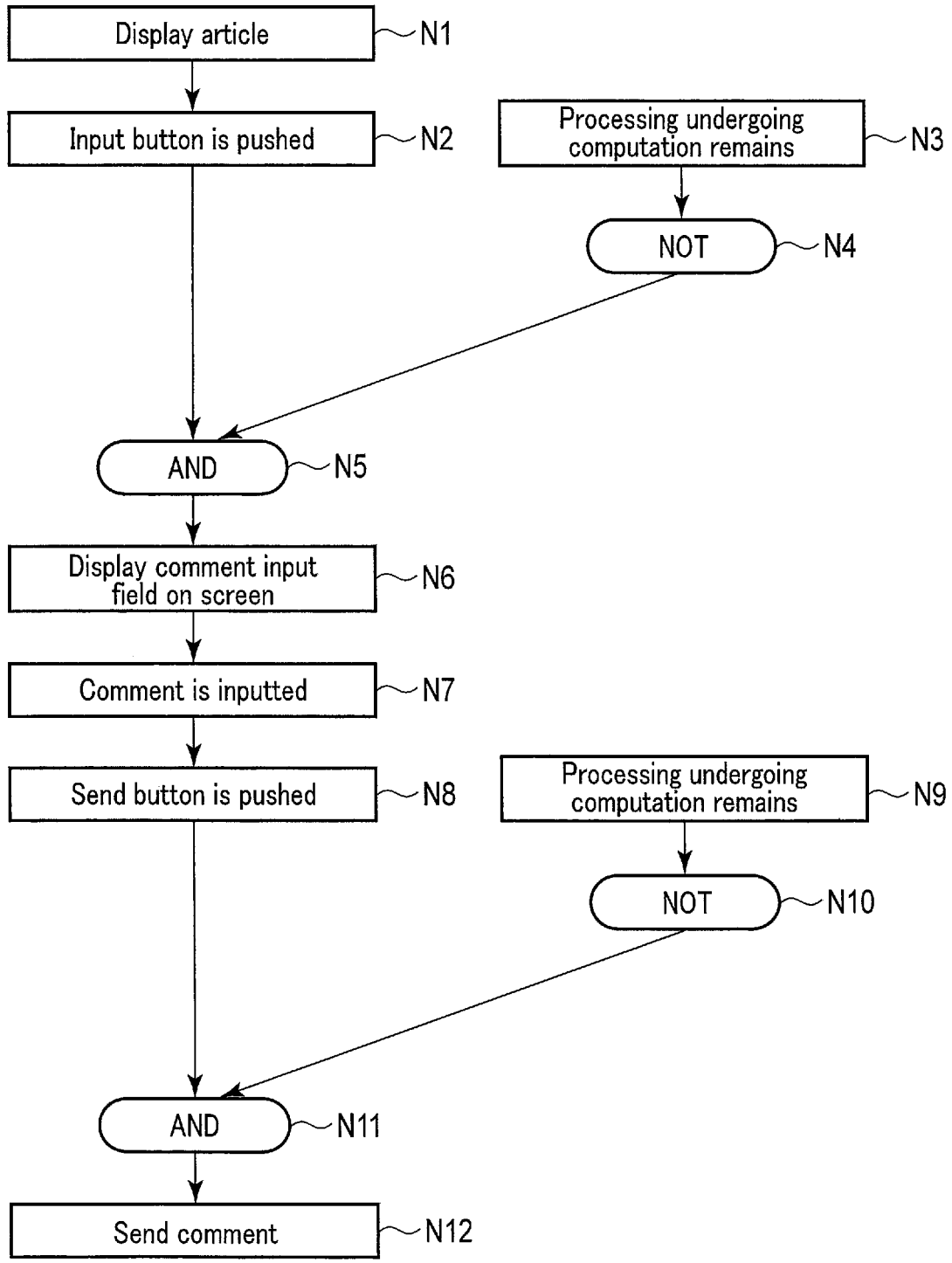
FIG. 2 is a diagram illustrating an example of an inputted graph structure.

In general, according to one embodiment, an information processing apparatus includes a processor. The processor receives an input of a graph structure. The graph structure has a plurality of nodes including text and edge interconnecting the nodes. The processor assigns the nodes of the graph structure to one or more clusters. The processor partitions the text included in the nodes assigned to the respective clusters into words. The processor classifies the words into 1) a word representing a subject or target of an operation, 2) word representing a content or state of the operation, and 3) other words. The processor extracts a first frequent word by counting a frequency of occurrence of one or more first words classified as the words representing the subject or target of the operation and extracts a second frequent word by counting a frequency of occurrence of one or more second words classified as the words representing the content or state of the operation, for the respective clusters.

Embodiments will be described hereinbelow with reference to the drawings.

First Embodiment

FIG. 1 is a diagram illustrating a configuration of an example of an information processing apparatus according to each of the embodiments. An information processing apparatus 1 includes an input unit 11, an assignment unit 12, a word classification unit 13, a frequent word extraction unit 14, and a graph generation unit 15.

The input unit 11 receives an input of graph structure data. The graph structure is obtained by using combinations of nodes and edges to represent a plurality of associations. Nodes are vertices in the graph structure. Edges are edges interconnecting the nodes. The graph structure data may be inputted in advance by the user.

FIG. 2 is a diagram illustrating an example of an inputted graph structure. The graph structure according to the embodiment represents the operation of a program or a device, for example. Here, nodes include two types of nodes, namely, nodes containing text and nodes containing logical operators. Text represents operation content or operating conditions for the program or device. Furthermore, the logical operators are logical operators such as AND, OR, and NOT. Further, nodes are interconnected by oriented edges. The relationships between the transitions of program or device operations or between I/Os thereof are represented by the oriented edges. Here, the graph structure in FIG. 2 is a graph structure representing an operation of a program for executing comment posting processing in which a user posts a comment in response to an article displayed on a display.

The graph structure data includes, for example, index numbers, content, and connection-destination index numbers. The index numbers are index numbers assigned to each of the nodes. The content is text data or logical operators representing the content of each node. The connection destination index numbers are the index numbers of connection-destination nodes for the nodes with corresponding index numbers.

The assignment unit 12 determines the ranges of clusters in the graph structure. To this end, the assignment unit 12 assigns, to the clusters, nodes which are included in the graph structure received from the input unit 11. Here, the assignment unit 12 may perform assignment such that one graph structure includes a plurality of clusters, or may perform assignment such that one graph structure includes only one cluster. The nodes assigned to the clusters may be determined as follows, for example.

The assignment unit 12 extracts, from within the graph structure, nodes without a connection-destination node (called terminal nodes). Terminal nodes are nodes for which a connection-destination index number has not been recorded. After extracting the terminal nodes, the assignment unit 12 extracts, as cluster candidate nodes, a plurality of nodes for which the distance from the terminal node exceeds a threshold value and assigns, to one cluster, nodes among the cluster candidate nodes which are connected to each other via an edge. For example, the assignment unit 12 tracks the nodes in a backward direction from the terminal node while counting the number of tracked edges. The assignment unit 12 then assigns, to one cluster, nodes linked to edges for which the number of tracked edges equals a threshold value, as well as the nodes tracked back from such nodes.

When nodes are assigned to a cluster in this manner, a plurality of closely positioned nodes in the graph structure are assigned to one cluster. In the case of a graph structure representing the operation of a program or a device, the content of nodes which are a short distance from each another in the graph structure is often close or related. Hence, using such assignment, the assignment of relatively suitable clusters is performed by means of relatively straightforward processing.

The word classification unit 13 receives, from the assignment unit 12, the graph structure data and the index numbers of the nodes belonging to each cluster. For the nodes which contain text data among the nodes contained in each cluster, the word classification unit 13 partitions the text data into word (morpheme) units and classifies the partitioned words by type. The word classification unit 13 classifies the respective words into three types, for example, according to the parts of speech thereof. In the embodiment, the word classification unit 13 classifies the words as words representing the subject or target of an operation, words representing the content or state of an operation, or other words. Words representing the subject or target of an operation are nouns or pronouns, or the like. Words representing the content or state of an operation are verbs or adjectives, or the like. Other words are prepositions or auxiliary verbs, or the like. Here, the partitioning and classification of words can be achieved by means of morphological analysis for the corresponding national language.

The frequent word extraction unit 14 receives, from the word classification unit 13, the graph structure data, the index numbers of the nodes belonging to each cluster, data of the words contained in each cluster, and information on the classification results of each of the words. The frequent word extraction unit 14 then counts, among the words contained in each cluster, duplicate counts in the word cluster of words representing the subject or target of an operation, and duplicate counts in the word cluster of words representing the content or state of the operation. Further, the frequent word extraction unit 14 extracts first frequent words which are a specific number of words with the top duplicate count that have been counted for the words representing the subject or target of the operation, and second frequent words which are a specific number of words with the top duplicate count that have been counted for the words representing the content or state of the operation. That is, in the embodiment, the frequent word extraction unit 14 extracts frequent words for each word type.

Here, the specific number of extracted words may be decided arbitrarily. Furthermore, the specific number of extracted words may be the same for all word types or may be different for each word type. In addition, for at least either word type among words representing the subject or target of an operation and words representing the content or state of the operation, when words with the top duplicate count do not satisfy the specific number, the frequent word extraction unit 14 may extract all the words which have been classified as the corresponding type. Conversely, for at least either word type, namely, words representing the subject or target of an operation and words representing the content or state of the operation, when the number of words with the top duplicate count is greater than the specific number, the frequent word extraction unit 14 may extract words amounting to the specific number from among the words with the top duplicate count. There are no particular restrictions on the way in which the words amounting to the specific number are extracted. A specific number of words may be extracted randomly, for example.

The graph generation unit 15 receives, from the frequent word extraction unit 14, graph structure data, information about the nodes belonging to the clusters, and the data of the frequent words extracted from the clusters. Further, the graph generation unit 15 generates data for a summarized graph structure from the graph structure data.

More specifically, the graph generation unit 15 substitutes one node for each of the clusters. In addition, the graph generation unit 15 causes the substituted nodes to retain text data representing the clusters. The text data representing the clusters is text data in which first frequent words and second frequent words are listed.

Furthermore, the graph generation unit 15 connects an oriented edge from a substituted node to a node outside the cluster in a case where a connection-destination index number of a node included in the cluster designates a node outside the cluster. Further, the graph generation unit 15 connects an oriented edge to a substituted node from a node outside the cluster in a case where the connection-destination index number of a node outside the cluster designates a node in the cluster.

Figure 3:
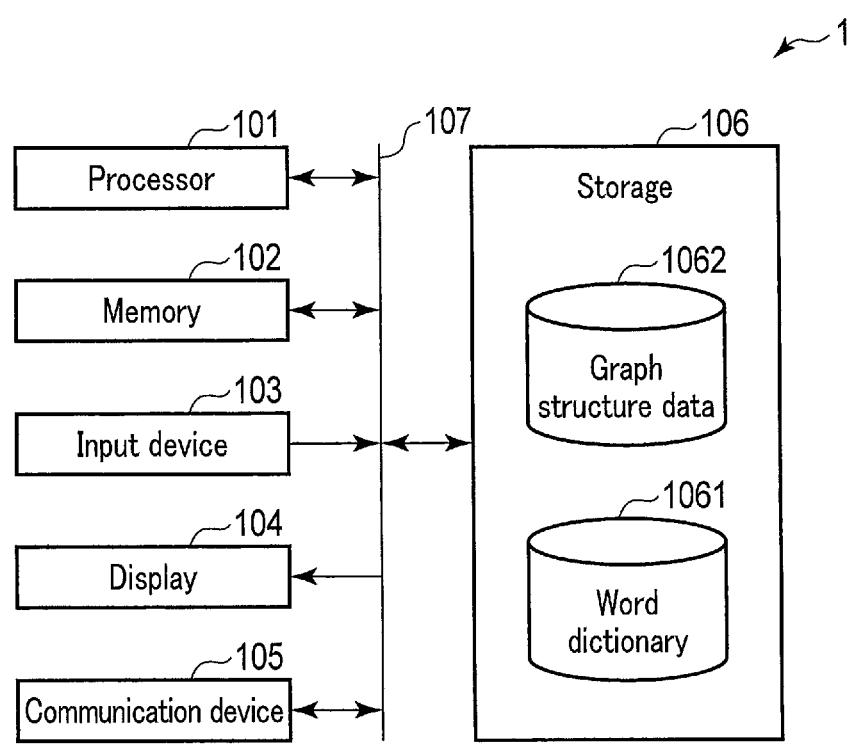
FIG. 3 is a diagram illustrating an example of a hardware configuration of the information processing apparatus.

FIG. 3 is a diagram illustrating an example of a hardware configuration of the information processing apparatus 1. The information processing apparatus 1 includes, as hardware, a processor 101, a memory 102, an input device 103, a display 104, a communication device 105, and storage 106, for example. The processor 101, memory 102, input device 103, display 104, communication device 105, and storage 106 are connected to a bus 107. The information processing apparatus 1 may be a terminal device such as personal computer (PC), a smartphone, and a tablet terminal. However, the information processing apparatus 1 is not limited thereto. The information processing apparatus 1 may be incorporated in any device that executes operations defined by a graph structure or in any device on which programs for executing operations defined by a graph structure are installed.

The processor 101 is a processor for controlling the overall operation of the information processing apparatus 1. By executing the programs stored in the storage 106, for example, the processor 101 operates as the input unit 11, the assignment unit 12, the word classification unit 13, the frequent word extraction unit 14, and the graph generation unit 15. The processor 101 is a CPU, for example. The processor 101 may also be an MPU, a GPU, an ASIC, or an FPGA, or the like. The processor 101 may be a single CPU or the like, or may be a plurality of CPUs or the like.

The memory 102 includes a ROM and a RAM. The ROM is a nonvolatile memory. The ROM stores a startup program or the like for the information processing apparatus 1. The RAM is a volatile memory. The RAM is used as a working memory at the time of processing by the processor 101, for example.

The input device 103 is an input device such as a touch panel, a keyboard, or a mouse. When the input device 103 is operated, a signal corresponding to the operation content is inputted to the processor 101 via the bus 107. The processor 101 performs various processing in response to the signal. The input device 103 can be used for inputting graph structure data, for example.

The display 104 is a display such as a liquid crystal display or an organic EL display. The display 104 displays various images.

The communication device 105 is a communication device that enables the information processing apparatus 1 to communicate with external equipment. The communication device 105 may be a communication device for wired communications or a communication device for wireless communications.

The storage 106 is storage such as a hard disk drive or a solid-state drive, for example. The storage 106 stores various programs executed by the processor 101 such as an information processing program. In addition, the storage 106 stores a word dictionary 1061 for subjecting text to morphological analysis and for classifying words. The storage 106 also stores graph structure data 1062. The graph structure data 1062 includes graph structure data inputted by the user. The graph structure data 1062 may also include, in addition to the graph structure data inputted by the user, graph structure data that is summarized based on graph structure data inputted by the user. The word dictionary 1061 and the graph structure data 1062 do not necessarily need to be stored in the storage 106. For example, the word dictionary 1061 and the graph structure data 1062 may also be stored on a server outside the information processing apparatus 1. In this case, the information processing apparatus 1 uses the communication device 105 to acquire information by accessing the server.

The bus 107 is a data transfer path for the exchange of data between the processor 101, the memory 102, the input device 103, the display 104, the communication device 105, and the storage 106.

Figure 4:
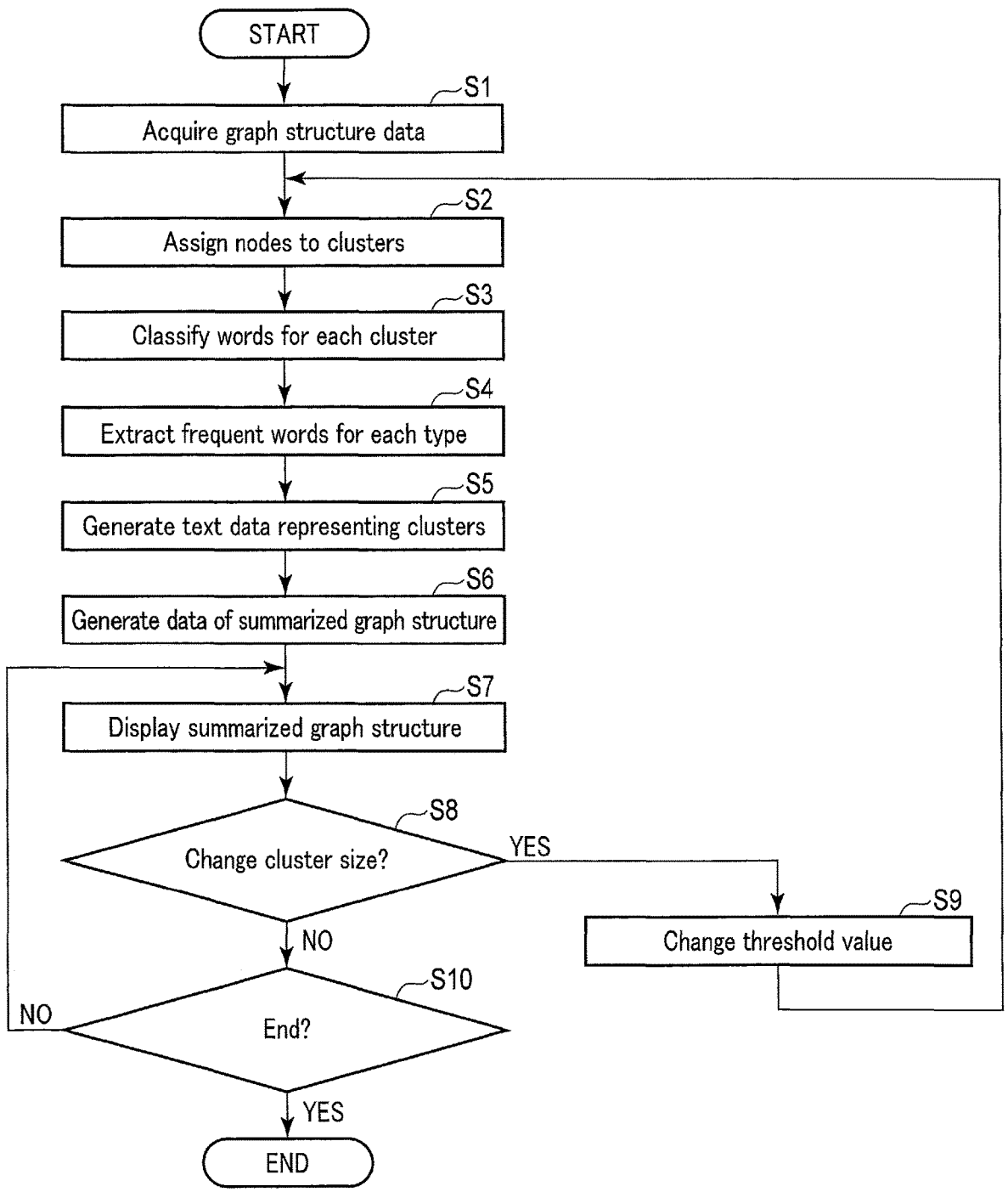
FIG. 4 is a flowchart illustrating a graph-structure summarization operation by the information processing apparatus.

The operation of the information processing apparatus 1 will be described next. FIG. 4 is a flowchart illustrating a graph-structure summarization operation constituting an information processing method of the information processing apparatus 1. The processing of FIG. 4 is executed by the processor 101.

In step S1, the processor 101 acquires graph structure data. As mentioned earlier, the graph structure data can be inputted by the user. The user inputs the graph structure data by operating the input device 103, for example. Note that the processor 101 may also acquire graph structure data which has been selected by the user from among the graph structure data 1062 stored in the storage 106.

Figure 5A:
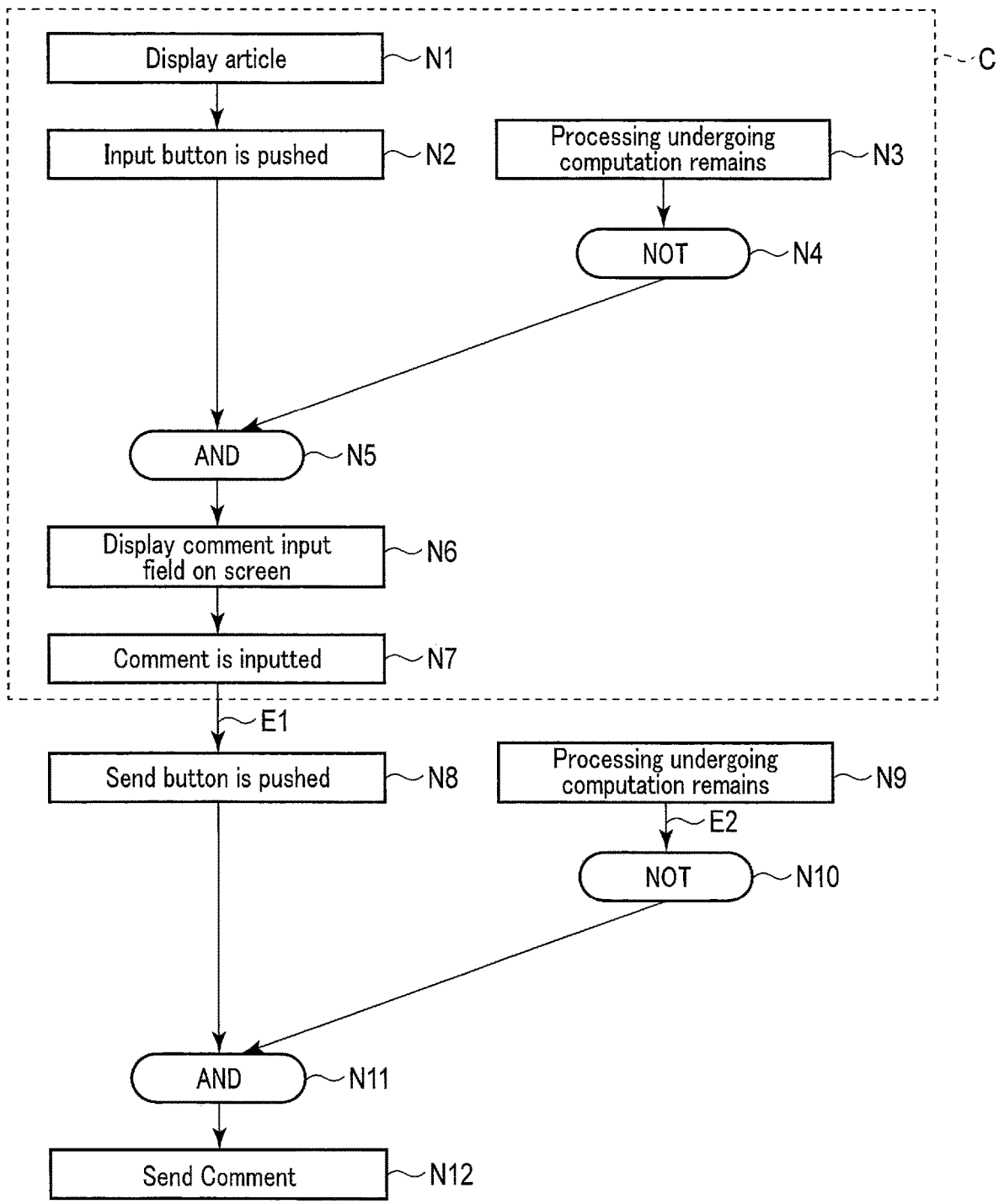
FIG. 5A is a diagram illustrating an example in which nodes are assigned to clusters.

In step S2, the processor 101 assigns each of the nodes of the graph structure to a cluster. As mentioned earlier, the processor 101 extracts the terminal node in the graph structure. For example, when the graph structure data in FIG. 2 is inputted, the terminal node is node N12. After extracting the terminal node, the processor 101 assigns, to one cluster, nodes linked to edges for which the number of tracked edges, while tracking the nodes in a backward direction from the terminal node, equals a threshold value, as well as the nodes tracked back from such nodes. For example, when a distance threshold value is set at "3", the edges for which the number of tracked edges equals the threshold value are, as illustrated in FIG. 5A, the third edges E1 and E2 from the terminal node N12. The processor 101 therefore assigns, to one cluster C, node N7 linked to edge E1, and nodes N6, N5, N4, N3, N2, and N1, which can be tracked back from node N7. Note that the only node linked to edge E2 is node N9. Hence, node N9 does not need to be assigned to a cluster.

In step S3, the processor 101 partitions the text included in the nodes belonging to each cluster into word units and classifies the partitioned words for each type. In the example in FIG. 2, the words representing the subject or target of an operation are words such as "article", "comment", "process", "button", and "screen". Furthermore, the words representing the content or state of the operation are words such as "display", "input", "push", and "calculate". Note that logical operators such as "AND" and "NOT" need not be extracted as words.

In step S4, the processor 101 extracts frequent words for each type. For example, when the specific number for the respective types is set at "1", the processor 101 extracts, as first frequent words, words with a top duplicate count from the words representing the subject or target of an operation and extracts, as second frequent words, words with a top duplicate count from the words representing the content or state of the operation. In the example of FIG. 2, the first frequent words are "comment" and "input" with a duplicate count of two, and the second frequent word is "display" with a duplicate count of two.

In step S5, the processor 101 lists the first frequent words and second frequent words to generate text data representing a cluster. When the text data representing a cluster is generated, there are no restrictions on the order with which the frequent words are listed. For example, the first frequent words and the second frequent words may be listed in that order. Additionally, words may be listed in descending order of duplicate count, for example.

In step S6, the processor 101 generates summarized graph structure data. More specifically, the processor 101 substitutes nodes for the clusters. The text data contained in the substituted nodes is the text data generated in step S5. The processor 101 then uses edges to connect the substituted nodes to other nodes. FIG. 5B is a diagram illustrating an example of a summarized graph structure. Node N13 in FIG. 5B is a node after substitution of the clusters.

In step S7, the processor 101 displays the summarized graph structure on the screen of the display 104. FIG. 6 is a diagram illustrating a display example of the summarized graph structure. As illustrated in FIG. 6, the processor 101 may display, on the display 104, a slider 1041 and an end button 1042 together with the summarized graph structure. The slider 1041 is a user interface constituting a designation unit which can be operated using a touch panel or the like, enabling the user to designate the cluster size. The end button 1042 is a user interface which can be operated using a touch panel or the like, enabling the user to perform an operation to end the displaying the summarized graph structure.

In step S8, the processor 101 determines whether the cluster size is to be changed. For example, it is determined that the cluster size is to be changed when the slider 1041 is operated by the user. The processing moves to step S9 when it is determined in step S8 that the cluster size is to be changed. The processing moves to step S10 when it is not determined in step S8 that the cluster size is to be changed.

In step S9, the processor 101 changes the threshold value for the distance in the cluster assignment according to the operation of the slider 1041. The processor 101 changes the threshold value for the distance from the terminal node when assigning nodes to the cluster, according to the operation of the slider 1041, for example. When the slider 1041 is operated such that the cluster size increases, the threshold value is changed to increase the number of nodes assigned to one cluster. That is, the processor 101 reduces the distance threshold value. Conversely, when the slider 1041 is operated such that the cluster size decreases, the threshold value is changed to reduce the number of nodes assigned to one cluster. That is, the processor 101 increases the distance threshold value. After the distance threshold value is changed, the processing returns to step S2. In this case, the processor 101 assigns nodes to the clusters based on the changed distance threshold value. The user is accordingly able to vary the number of nodes assigned to the clusters. The user is thus able to vary the complexity of the graph structure.

In step S10, the processor 101 determines whether to end the graph structure summarization processing. For example, it is determined that the graph structure summarization processing is to be ended when the end button 1042 is operated by the user. The processing returns to step S7 when it is not determined in step S10 that the graph structure summarization processing is to be ended. In this case, the displaying of the summarized graph structure is continued. When it is determined in step S10 that the graph structure summarization processing is to be ended, the processor 101 ends the processing of FIG. 4.

According to the first embodiment as described earlier, text representing clusters is generated as a result of listing the frequent words extracted from the words representing the subject or target of an operation and the frequent words extracted from the words representing the content or state of the operation, respectively, in the text which is included in the nodes of the graph structure. That is, the text representing a cluster includes the subject and content of the operation. Therefore, the user is capable of grasping "what" and "what has happened" simply by viewing the text representing the cluster. Text representing a cluster can be suitably determined accordingly.

In addition, in the embodiment, when assigning nodes to a cluster, a plurality of nodes for which the distance from the terminal node exceeds the threshold value are extracted as cluster candidate nodes, and nodes among the cluster candidate nodes which are interconnected via an edge are assigned to one cluster. By assigning nodes to a cluster in this manner, a plurality of closely positioned nodes in the graph structure are assigned to one cluster. In the case of a graph structure representing the operation of a program or a device, the content of nodes which are a short distance from each another in the graph structure is often close or related. Hence, using such assignment, the assignment of relatively suitable clusters is performed by means of relatively straightforward processing.

Modification Examples

A modification example of the first embodiment will be described next. In the foregoing first embodiment, no restrictions are placed on the number of nodes assigned to one cluster. Therefore, a plurality of nodes for which the distance from the terminal node exceeds the threshold value are extracted as cluster candidate nodes, and if there are nodes among the cluster candidate nodes which are interconnected via an edge, such nodes are assigned to one cluster. However, an upper limit may also be placed on the number of nodes assigned to one cluster. In this case, when the number of nodes assigned to a cluster reaches the upper limit, the assignment unit 12 assigns the remaining nodes to another cluster.

Furthermore, in the first embodiment, the nodes that have been substituted for clusters have the same shape as normal nodes. However, the nodes that have been substituted for clusters may have a different shape than normal nodes. In addition, the nodes that have been substituted for clusters may be a different color than normal nodes. There may also be a variation in the size, shape, and color, and so forth, of the nodes that have been substituted for clusters according to the cluster size.

Furthermore, in the first embodiment, a summarized graph structure is generated in the information processing apparatus 1, and the generated graph structure is displayed on the display. However, the generation and displaying of the summarized graph structure need not necessarily be performed by the information processing apparatus 1. In this case, the information processing apparatus 1 stores, in the storage 106, for example, graph structure data, information on the nodes belonging to the cluster, and data of the frequent words extracted from the cluster, and transmits this information externally with the necessary timing.

Second Embodiment

A second embodiment will be described next. A description of the parts described in the first embodiment will be omitted here.

In the first embodiment, the words for generating the text representing a cluster are decided according to their duplicate counts in the text included in the nodes assigned to the cluster. In the second embodiment, the frequent word extraction unit 14 increases the counts of the duplicate counts for specific, predefined words by three times, ten times, and so forth. In this case, the specific words are easily extracted as frequent words.

The predefined words are words which are important for representing the operation, such as "emergency" or "urgent", for example. The predefined words may be pre-stored in the word dictionary 1061, for example. Furthermore, the predefined words may be designated by the user.

In the second embodiment, by facilitating the extraction of specific words during the extraction of frequent words in generating the text representing a cluster, a situation where important words are not displayed in the text representing the cluster is easily avoided.

Third Embodiment

A third embodiment will be described next. A description of the parts described in the first embodiment will be omitted here.

In the third embodiment, partial graph structure data, and text data that is associated with the partial graph structure data are stored in the storage 106, for example. The partial graph structure is a graph structure in which the connection between the placement of a plurality of nodes and edges between the nodes are predefined. The partial graph structure is a graph structure representing processing that is typical and occurs frequently such as "error processing". Text data representing the content of the partial graph structure such as "error processing" is associated with this kind of partial graph structure. Additionally, for example, the nodes N2, N3, N4, N5, N6, and N7 in FIG. 2 can be collectively defined as being a partial graph structure representing "comment input processing". Text data such as "comment input processing", for example, is associated with this kind of partial graph structure.

In the third embodiment, the assignment unit 12 extracts a partial graph structure from the received graph structure when assigning nodes to clusters. The assignment unit 12 substitutes one node for a plurality of nodes corresponding to the partial graph structure when the partial graph structure has been extracted from the received graph structure.

The frequent word extraction unit 14 excludes the words extracted from the nodes corresponding to the partial graph structure from targets for frequent word counting, even for nodes which have been provisionally assigned to a cluster.

In the third embodiment, one node is substituted for nodes matching the partial graph structure when the data of a summarized target graph structure has a predefined partial graph structure. Furthermore, nodes matching the partial graph structure are excluded from the targets for the counting of duplicate counts. It is accordingly possible to prevent extracted frequent words from being only representative of typical processing.

Fourth Embodiment

A fourth embodiment will be described next. A description of the parts described in the first embodiment will be omitted here.

In the first embodiment, the assignment unit 12 extracts, as cluster candidate nodes, a plurality of nodes for which the distance from the terminal node exceeds a threshold value and assigns, to one cluster, nodes among the cluster candidate nodes which are connected to each other via an edge. The assignment of nodes to clusters is not limited to the foregoing configuration. The assignment unit 12 may also assign nodes to clusters using a method whereby there is a minimal number of edges connecting clusters when the graph structure is partitioned by means of clusters, as in the case of spectral clustering, for example. More specifically, the assignment unit 12 may assign nodes to clusters by means of a calculation such as that below. Here, in the fourth embodiment, the graph structure does not need to be an oriented graph and may include a loop structure.

The assignment unit 12 creates a graph Laplacian matrix L from the graph structure data. The graph Laplacian matrix L is a matrix that has the same numbers of rows and columns as the number of nodes. Supposing that i and j are node index numbers, the diagonal component $L_{ij}(i=j)$ of the graph Laplacian matrix L is the number of edges connected to node i. However, the non-diagonal component $L_{ij}(i \neq j)$ of the graph Laplacian matrix L is −1 when there is an edge between node i and node j and is 0 when there is no edge.

Thereafter, the assignment unit 12 calculates the eigenvalues of the graph Laplacian matrix L and eigenvectors corresponding to the eigenvalues. Further, the assignment unit 12 extracts the minimum value among the non-zero eigenvalues and extracts an eigenvector A which corresponds to the minimum value. An element Ai of the extracted eigenvector A corresponds to node i. For example, the assignment unit 12 divides element Ai into positive and negative components. In this case, the nodes are divided into two clusters. Furthermore, the assignment unit 12 divides element Ai by using k-means, for example. In this case, nodes are divided into k clusters.

The assignment unit 12 regards a partitioned cluster as one graph structure and repeats the same processing until the number of clusters reaches a predetermined number. Here, the predetermined number of clusters can be decided according to the sizes of the respective clusters. That is, the predetermined number of clusters can be designated by the user by means of a user interface similar to the slider 1041 illustrated in FIG. 6.

In the fourth embodiment, when nodes are assigned to clusters, there is a reduction in the number of edges fragmented by the clusters, and hence relevant nodes are easily assigned to the clusters.

Fifth Embodiment

A fifth embodiment will be described next. A description of the parts described in the first embodiment will be omitted here.

In the first embodiment, the frequent word extraction unit 14 counts the duplicate counts individually for the words representing the subject or target of an operation and words representing the content or state of the operation, respectively. However, the frequent word extraction unit 14 may also extract frequent words by counting the duplicate counts of combinations of words. For example, the frequent word extraction unit 14 extracts, among the words included in each node, words classified as either of two word types, namely, words representing the subject or target of an operation and words representing the content or state of the operation, and generates, as cooccurrence pairs, all the combinations obtained by combining two of the extracted words. Thereafter, the frequent word extraction unit 14 counts the duplicate counts of the cooccurrence pairs generated for each of the nodes assigned to the cluster and extracts, as frequent words, a top specific number of cooccurrence pairs with a high duplicate count.

In the fifth embodiment, by counting duplicate counts using combinations of words representing the subject or target of an operation and words representing the content or state of the operation, words with related meanings such as an operation and the target thereof, or an operation and the subject thereof, can be extracted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a processor configured to:

receive an input of a graph structure having a plurality of nodes including text and edge interconnecting the nodes;

assign the nodes of the graph structure to one or more clusters;

partition the text included in the nodes assigned to the respective clusters into words;

classify the words into 1) a word representing a subject or target of an operation, 2) a word representing a content or state of the operation, and 3) other words;

for the respective clusters, extract a first frequent word by counting a frequency of occurrence of one or more first words classified as the words representing the subject or target of the operation and extract a second frequent word by counting a frequency of occurrence of one or more second words classified as the words representing the content or state of the operation; and generate a summarized graph structure by substituting, for the clusters, nodes including text that lists the extracted first frequent words and second frequent words.

2. The information processing apparatus according to claim 1, wherein, when the first words include a predefined first specific word, the processor renders a count of a frequency of occurrence of the predefined first specific word higher than a count of a frequency of occurrence of other first words, and wherein, when the second words include a predefined second specific word, the processor renders a count of a frequency of occurrence of the predefined second specific word higher than a count of a frequency of occurrence of other second words.

3. The information processing apparatus according to claim 1, wherein, when the graph structure includes a predefined partial graph structure, the processor assigns, to one node, the nodes corresponding to the partial graph structure included in the graph structure, and wherein, for the nodes corresponding to the partial graph structure, the processor extracts defined text that is pre-associated with the partial graph structure and excludes, from a counting target for extracting the first frequent words and the second frequent words, the words extracted from the nodes corresponding to the partial graph structure.

4. The information processing apparatus according to claim 1, wherein the edge is an oriented edge, wherein the processor extracts, as cluster candidate nodes, a plurality of the nodes, among the nodes, for which a distance from a terminal node is further than a threshold value, the terminal node not being connected to a destination of the oriented edge, and wherein the processor assigns, to one cluster, nodes among the cluster candidate nodes to which the oriented edge is connected.

5. The information processing apparatus according to claim 4, further comprising:

an interface for designation of a size of the cluster by a user, wherein the processor varies the threshold value according to a size designated using the interface.

6. The information processing apparatus according to claim 1, wherein the processor assigns the nodes to the clusters so as to reduce a number of the edges interconnecting a plurality of the clusters.

7. The information processing apparatus according to claim 6, further comprising:

an interface for designation of a size of the clusters by a user, wherein the processor varies a total number of the clusters according to a size designated using the interface.

8. The information processing apparatus according to claim 1, wherein the processor:

generates, for each node assigned to the cluster, cooccurrence pairs configured from the first words and the second words;

counts numbers of times the respective cooccurrence pairs are generated; and extracts cooccurrence pairs having high counts.

9. The information processing apparatus according to claim 1, wherein the graph structure is a graph structure representing an operation of a program or a device.

10. An information processing method, comprising:

receiving an input of a graph structure that has a plurality of nodes including text and an edge interconnecting the nodes and assigning the nodes of the graph structure to one or more clusters;

partitioning the text included in the nodes assigned to the respective clusters into words;

classifying the words into 1) a word representing a subject or target of an operation, 2) a word representing a content or state of the operation, and 3) other words;

for the respective clusters, extracting a first frequent word by counting a frequency of occurrence of one or more first words classified as the words representing the subject or target of the operation and extracting a second frequent word by counting a frequency of occurrence of one or more second words classified as the words representing the content or state of the operation; and generating a summarized graph structure by substituting, for the clusters, nodes including text that lists the extracted first frequent words and second frequent words.

11. A non-transitory storage medium that stores an information processing program for causing a processor to:

receive an input of a graph structure that has a plurality of nodes including text and an edge interconnecting the nodes and assign the nodes of the graph structure to one or more clusters;

partition the text included in the nodes assigned to the respective clusters into words;

classify the words into 1) a word representing a subject or target of an operation, 2) a word representing a content or state of the operation, and 3) other words;

for the respective clusters, extract a first frequent word by counting a frequency of occurrence of one or more first words classified as the words representing the subject or target of the operation and extract a second frequent word by counting a frequency of occurrence of one or more second words classified as the words representing the content or state of the operation; and generate a summarized graph structure by substituting, for the clusters, nodes including text that lists the extracted first frequent words and second frequent words.

* * * * *